United States Patent
Yan et al.

(10) Patent No.: US 12,022,777 B2
(45) Date of Patent: Jul. 2, 2024

(54) HYDRAULIC DESIGN METHOD, DEVICE AND EQUIPMENT FOR MOBILE DRIP IRRIGATION ON CENTER PIVOT IRRIGATION SYSTEM

(71) Applicant: China Agricultural University, Beijing (CN)

(72) Inventors: Haijun Yan, Beijing (CN); Haohui Zhang, Beijing (CN); Xin Hui, Beijing (CN)

(73) Assignee: China Agricultural University, Beijing (CN)

( * ) Notice: Subject to any disclaimer, the term of this patent is extended or adjusted under 35 U.S.C. 154(b) by 2 days.

(21) Appl. No.: 18/111,645

(22) Filed: Feb. 20, 2023

(65) Prior Publication Data
US 2023/0337605 A1  Oct. 26, 2023

(30) Foreign Application Priority Data
Apr. 24, 2022 (CN) .......................... 202210436753.1

(51) Int. Cl.
*A01G 25/02* (2006.01)
*A01G 25/09* (2006.01)
*A01G 25/16* (2006.01)

(52) U.S. Cl.
CPC ............. *A01G 25/02* (2013.01); *A01G 25/09* (2013.01); *A01G 25/16* (2013.01)

(58) Field of Classification Search
CPC ......... A01G 25/02; A01G 25/09; A01G 25/16
See application file for complete search history.

(56) References Cited

U.S. PATENT DOCUMENTS

| | | | | |
|---|---|---|---|---|
| 5,882,141 | A  * | 3/1999 | Byles | ..................... E02B 13/00 |
| | | | | 239/562 |
| 2016/0021835 | A1* | 1/2016 | Teeter | ................... A01G 25/092 |
| | | | | 239/737 |
| 2016/0205877 | A1* | 7/2016 | Rooney | ................... A01G 25/16 |

OTHER PUBLICATIONS

CNIPA, Notification of First Office Action for CN202210436753.1, Dec. 8, 2023.
China Agricultural University (Applicant), Reply to Notification of First Office Action for CN202210436753.1, w/ (allowed) replacement claims, Dec. 28, 2023.
CNIPA, Notification to grant patent right for invention in CN202210436753.1, Jan. 10, 2024.

* cited by examiner

*Primary Examiner* — Mark A Connolly

(57) ABSTRACT

Hydraulic design method, device and equipment for mobile drip irrigation system are provided. Different distances between drip-lines, a depth of a bottom boundary, a flux of infiltration boundary and soil hydraulic parameters are input into a simulation model, and output parameters of the model including a soil water content at each observation point and an amount of deep percolation loss under the different distances at the same irrigation depth are acquired. An optimal distance between drip-lines is obtained according to an installation cost function, the soil water content at each observation point and the amount of deep percolation loss, and lengths of drip-lines matched with the optimal distance are obtained. Structural parameters of the irrigation system and a designed irrigation depth are obtained to determine working parameters. The irrigation system with the optimal distance and the matched lengths of drip-lines is controlled to irrigate crops based on the working parameters.

6 Claims, 4 Drawing Sheets

HYDRAULIC DESIGN METHOD, DEVICE AND EQUIPMENT FOR MOBILE DRIP IRRIGATION ON CENTER PIVOT IRRIGATION SYSTEM

CROSS REFERENCE TO RELATED APPLICATION

This application claims the priority of Chinese Patent Application No. 202210436753.1, entitled "Hydraulic Design method, Device and Equipment for Mobile Drip Irrigation on Center Pivot Irrigation System", filed on Apr. 24, 2022, the disclosure of which is incorporated herein by reference in its entirety.

BACKGROUND

1. Technical Field

The invention relates to the field of agricultural water-saving irrigation technology, and particularly to hydraulic design method, device and equipment for mobile drip irrigation on center pivot irrigation system.

2. Description of Related Art

Under the increasingly severe situation of agricultural water shortage, people are continuously developing new water-saving irrigation equipment and new irrigation methods. At present, due to advantages of large irrigation area, high degree of automation, strong terrain adaptability and low operation and maintenance cost, a center pivot irrigation system is widely used in agricultural and pastoral areas with open land, few obstacles in the field and relatively high degree of intensive management. However, there are some shortcomings during sprinkler irrigation, such as evaporation and wind drift loss, which affect its popularization and application in arid and semi-arid areas. In order to overcome these disadvantages, mobile drip irrigation on center pivot irrigation system has emerged in recent years.

The mobile drip irrigation combines comprehensive advantages of center pivot irrigation system and drip irrigation system, which has advantages of large irrigated coverage area, high automation, and low evaporation and drift loss. However, there are relatively few discussions on installation and operation parameters of mobile drip irrigation system, such as lengths of drip-lines, a distance between drip-lines, and a traveling speed of the center pivot irrigation system.

An irrigation process of the drip-lines in the mobile drip irrigation is different from that of traditional drip-lines used in the drip irrigation system, and their technical parameters are quite different. A design method of the traditional drip irrigation system cannot be directly applied to the mobile drip irrigation system. An unreasonably designed mobile drip irrigation system is easy to cause surface runoff, deep percolation loss, poor irrigation uniformity and other problems, which will reduce the irrigation water use coefficient and the crop yield.

Therefore, scientific hydraulic design methods should be proposed to meet the needs of promotion and application of mobile drip irrigation system. On the basic of considering land areas, soil texture, crop species, irrigation water sources, main parameters of the center pivot irrigation system and the drip-lines, technical characteristics of mobile drip irrigation should also be fully considered to make this system more efficient.

SUMMARY

Accordingly, technical problems expected to be solved by the invention are that the surface runoff, deep percolation loss, poor irrigation uniformity and the other problems caused by unreasonably designed mobile drip irrigation systems.

In order to solve the above technical problems, the invention provides hydraulic design method, device and equipment for mobile drip irrigation on center pivot irrigation system, which is used to solve the problems caused by unreasonable installation and working parameters of mobile drip irrigation system in the current technology, and improve the irrigation water use coefficient and crop yield. The method includes:

inputting distances between drip-lines, and a depth of a bottom boundary, a flux of infiltration boundary and soil hydraulic parameters of a soil domain into a simulation model; and acquiring output parameters of the simulation model after simulation, including a soil water content at each observation point and an amount of deep percolation loss under different distances between drip-lines at the same irrigation depth;

determining an installation cost function of the system, obtaining an optimal distance between drip-lines according to the installation cost function of the system, the soil water content at each observation point and the amount of deep percolation loss, and obtaining a length of each drip-line matched with the optimal distance between drip-lines;

obtaining structural parameters of the center pivot irrigation system and a designed irrigation depth, and determining working parameters of the system according to the structural parameters and the designed irrigation depth; and controlling the center pivot irrigation system to irrigate crops based on the working parameters, wherein the irrigation system is installed in the optimal distance between drip-lines and the length of each drip-line matched with the optimal distance between drip-lines.

According to the hydraulic design method provided by this invention, before inputting the distances between drip-lines, and the depth of the bottom boundary, the flux of infiltration boundary and the soil hydraulic parameters of the soil domain into the simulation model, the method further includes:

obtaining the depth of the bottom boundary according to a depth of root distribution of the crops;

obtaining the flux of infiltration boundary according to working parameters of the drip-lines; and obtaining the soil hydraulic parameters according to soil basic physical parameters.

According to the hydraulic design method for mobile drip irrigation on center pivot irrigation system provided by this invention, determining an installation cost function of the system, obtaining an optimal distance between drip-lines according to the installation cost function of the system, the soil water content at each observation point and the amount of deep percolation loss, specifically includes the following steps:

obtaining the installation cost function of the system, which is configured (i.e., structured and arranged) to represent a functional relation between the system installation cost and the distance between drip-lines.

obtaining a uniformity coefficient of soil water content under different distances between drip-lines according to the soil water content at each observation point;

obtaining the amount of deep percolation loss under different distances between drip-lines according to a cumulative flux across the bottom boundary of the soil domain; and obtaining the optimal distance between drip-lines according to the installation cost function of the system, the uniformity coefficient of soil water content under different distances between drip-lines, and the amount of deep percolation loss under different distances between drip-lines.

According to the hydraulic design method for mobile drip irrigation on center pivot irrigation system provided by this invention, obtaining the optimal distance between drip-lines according to the installation cost function, the uniformity coefficient of soil water content under the different distances between drip-lines and the amount of deep percolation loss under the different distances between drip-lines, specifically includes the following steps:

obtaining a uniformity coefficient function through function fitting according to the uniformity coefficient of soil water content under different distances between drip-lines, wherein the uniformity coefficient function is used for expressing the functional relation between the irrigation uniformity and the distances between drip-lines;

obtaining a drainage loss function through function fitting according to the amount of deep percolation loss under different distances between drip-lines, wherein the drainage loss function is used for expressing the functional relation between the amount of deep percolation loss and the distances between drip-lines;

developing a multi-criteria objective function according to the uniformity coefficient function, the drainage loss function, and the installation cost function of the system; and obtaining the optimal distance between drip-lines by solving the multi-criteria objective function.

According to the hydraulic design method for mobile drip irrigation on center pivot irrigation system provided by this invention, the developing a multi-criteria objective function according to the uniformity coefficient function, the drainage loss function, and the installation cost function of the system, specifically includes the following steps:

setting a first weighting factor for the uniformity coefficient function in the multi-criteria objective function according to crop species;

setting a second weighting factor for the drainage loss function in the multi-criteria objective function according to soil conditions;

setting a third weighting factor for the installation cost function of the system in the multi-criteria objective function according to a cost budget; and developing the multi-criteria objective function according to the first weighting factor, the second weighting factor and the third weighting factor.

According to the hydraulic design method for mobile drip irrigation on center pivot irrigation system provided by this invention, the obtaining a length of each drip-line matched with the optimal distance between drip-lines, specifically includes the following steps:

acquiring an emitter discharge of each drip-line, a distance between emitters of the drip-lines and an objective discharge of each drip-line;

acquiring the length of each drip-line matched with the optimal distance between drip-lines according to the emitter discharge of each drip-line, the distance between emitters of the drip-lines and the objective discharge of each drip-line;

the objective discharge of each drip-line is calculated based on an area principle, and an area principle calculation formula is as follows:

$$\frac{Q_s - Q_e}{\pi L^2} = \frac{Q_s - Q_i}{\pi r_i^2}$$

where $Q_s$ is the inlet flow of the center pivot irrigation system; $Q_e$ is the tail end flow of the main water conveying pipeline in the mobile drip irrigation area; L is the length of the whole unit for mobile drip irrigation; $r_i$ is the distance from the ith drip-line to the center pivot, and subscript i is the serial number of the drip-lines; $Q_i$ is the flow of the upstream of the ith drip-line in the main water conveying pipeline;

further, a calculation formula of the objective discharge of each drip-line is as follows:

$$q_i = (Q_s - Q_e)\frac{a_{i+1}\left(2\sum_{j=1}^{i} a_j + a_{i+1}\right)}{\left(\sum_{j=1}^{N} a_j\right)^2}$$

where $a_{i+1}$ is the distance between the ith and the (i+1)th drip-lines; $q_i$ is the objective discharge of the ith drip-line; N is the total number of drip-lines.

further, a calculation formula of the length of each drip-line is as follows:

$$l_i = d\left[\frac{q_i}{q_d}\right]$$

where $l_i$ is the length of the ith drip-line; $q_d$ is the emitter discharge of the drip-line; d is the distance between drip-line emitters.

The invention further provides a hydraulic design device for mobile drip irrigation on center pivot irrigation system, which may include:

a simulation unit, which is used for inputting different distances between drip-lines, and a depth of a bottom boundary, a flux of infiltration boundary and soil hydraulic parameters of a soil domain into a simulation model, and acquiring output parameters of the model after simulation, including a soil water content at each observation point and an amount of deep percolation loss under the different distances between drip-lines at the same irrigation depth;

a determining unit, which is used for determining an installation cost function of the system, obtaining an optimal distance between drip-lines according to the installation cost function of the system, the soil water content at each observation point and the amount of deep percolation loss, and obtaining a length of each drip-line matched with the optimal distance between drip-lines;

an acquiring unit, which is used for acquiring structural parameters of the irrigation system and a designed irrigation depth, and determining working parameters of the irrigation system according to the structural parameters of the irrigation system and the designed irrigation depth; and a control unit, which is used for controlling the irrigation system to operate according to the working parameters and employing the optimal distance between drip-lines and the length of each drip-line matched with the optimal distance between drip-lines.

The invention further provides an electronic equipment/device which includes a memory, a processor and a computer program stored on the memory and capable of running on the processor, wherein the processor, when executes the program, realizes the hydraulic design method for mobile drip irrigation on center pivot irrigation system.

The invention provides the hydraulic design method, device and equipment for mobile drip irrigation on center pivot irrigation system, which are characterized in that different distances between drip-lines, soil hydraulic parameters, the depth of the bottom boundary and the flux of infiltration boundary of the soil domain are inputted into a simulation model, the soil water content at each observation point and the amount of deep percolation loss of the soil domain at different distances between drip-lines at the same irrigation depth output by the simulation model are obtained. Then the optimal distance between drip-lines is obtained according to an installation cost function of the system, a uniformity coefficient function and a drainage loss function. The length of each drip-line matched with the optimal distance between drip-lines is calculated after the optimal distance between drip-lines is determined. The structural parameters of the center pivot irrigation system and the designed irrigation depth are then obtained, the working parameters of the irrigation system are determined according to the structural parameters of the center pivot irrigation system and the designed irrigation depth. Finally, the irrigation system is controlled to operate according to the working parameters, and the crops are irrigated by employing the optimal distance between drip-lines and the length of each drip-line matched with the optimal distance between drip-lines. The soil texture and the crop species are considered in this hydraulic design method, and further, the working parameters, the optimal distance between drip-lines under the current condition and the lengths of respective drip-lines matched with the optimal distance between drip-lines are employed to irrigate to meet the requirement of crops. With this hydraulic design method, precise irrigation can be achieved, and the irrigation water use coefficient and crop yield can be improved.

BRIEF DESCRIPTION OF DRAWINGS

In order to more clearly illustrate technical solutions of embodiments of the invention or the related art, drawings will be used in the description of embodiments or the related art will be given a brief description below. Apparently, the drawings in the following description only are some of embodiments of the invention, the ordinary skill in the art can obtain other drawings according to these illustrated drawings without creative effort.

DETAILED DESCRIPTION OF EMBODIMENTS

In the following, with reference to attached drawings of embodiments of the invention, technical solutions in the embodiments of the invention will be clearly and completely described. Apparently, the embodiments of the invention described below only are some of embodiments of the invention, but not all embodiments. Based on the described embodiments of the invention, all other embodiments obtained by ordinary skill in the art without creative effort belong to the scope of protection of the invention.

A hydraulic design method for mobile drip irrigation on center pivot irrigation system of the present invention is described below with reference to FIG. 1 through FIG. 7.

Figure 1:
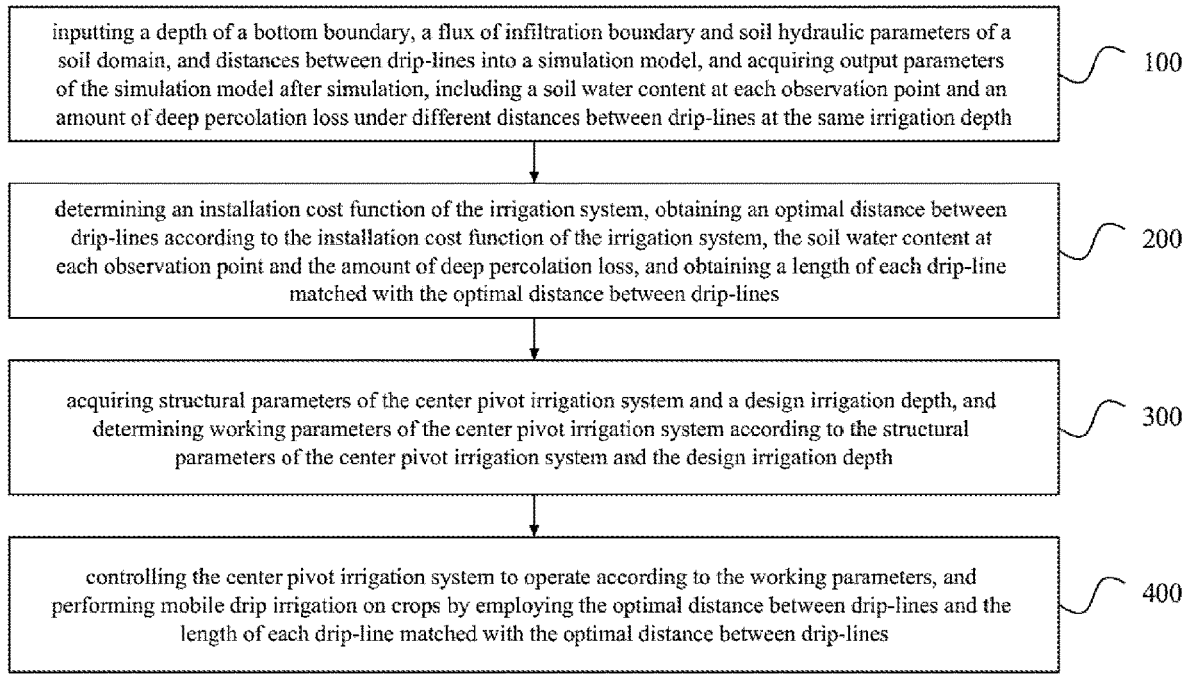
FIG. 1 is a first flowchart of a hydraulic design method for mobile drip irrigation on center pivot irrigation system provided by this invention.

FIG. 1 is a first flowchart of a hydraulic design method for mobile drip irrigation on center pivot irrigation system provided by this invention. The method includes the following steps 100~400.

Figure 2:
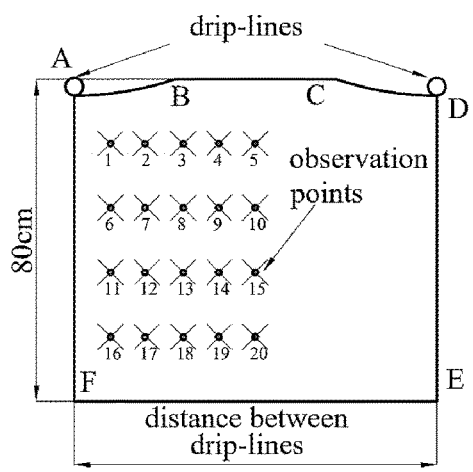
FIG. 2 is a schematic diagram of a distance between drip-lines provided by this invention.

Step 100, inputting a depth of a bottom boundary, a flux of infiltration boundary and soil hydraulic parameters of a soil domain, and distances between drip-lines into a simulation model, and acquiring output parameters of the simulation model after simulation, including a soil water content at each observation point and an amount of deep percolation loss under different distances between drip-lines at the same irrigation depth;

The distance between drip-lines refers to the spacing between any two drip-lines of the mobile drip irrigation on the center pivot irrigation system. The amount of deep percolation loss refers to the cumulative flux across the bottom boundary of the soil domain. Referring to FIG. 2, the distance between drip-lines can be the distance between FE, wherein 1-20 in FIG. 2 are 20 observation points in the soil domain, and since the soil water movement is symmetrically on both sides of the soil domain, the observation points are uniformly arranged in a half area of the soil domain, so that the occupation of calculation resources are reduced, and the simulation efficient can be further improved. The boundaries AB and CD are infiltration boundaries, and the second-type boundary conditions are adopted. The boundaries AF, BC and DE are set as the no-flux boundary, and the bottom boundary FE is set as free drainage boundary. In addition, the distance between drip-lines can be flexibly arranged according to parameters such as the crop species, the planting condition or the soil physical property. For example, for crops with larger water demanding, the distance between drip-lines can be reasonably selected in a small distance range, for crops with larger planting row spacing such as corn and so on, the distance between drip-lines can be reasonably selected in a larger distance range. And in addition, the soil water content and the amount of deep percolation loss of the soil domain under different distances between drip-lines needs to be calculated under the condition of controlling the same irrigation depth, so that the influence of the distance between drip-lines on the irrigation performance of the mobile drip irrigation system can be clearly obtained.

The current mobile drip irrigation system is still lack of a scientific hydraulic design method, the parameters suggested by the manufacturers are not necessarily suitable for the local soil texture, the crop species or the structural parameters of the existing center pivot irrigation system. In addition, the irrigation process of drip-lines in mobile drip irrigation system is different from that of ordinary drip-lines using in drip irrigation system, and their technical parameters are quite different. The design method of traditional drip irrigation system cannot be directly applied to mobile drip irrigation system. Therefore, numerical simulation is adopted in the invention to set different distances between drip-lines, and the optimal distance between drip-lines under the current condition is determined according to the uniformity coefficient of soil water content and the amount of deep percolation loss under different distances between drip-lines, so that high irrigation performance can be achieved. In addition, the distance between drip-lines can be set at equal intervals, for example, the distance between drip-lines can respectively be 0.30 m, 0.45 m, 0.60 m, 0.75 m, 0.90 m, 1.05 m, 1.20 m and 1.35 m, the distance between drip-lines can also be sequentially set in an equal difference increasing mode, set in an equal ratio increasing mode or set randomly, and so on, which is not limited by this invention.

It should be noted that the depth of the bottom boundary refers to the vertical distance between the bottom boundary and the upper boundary of the soil domain in the mobile drip irrigation numerical simulation process. Generally, the depth of the bottom boundary depends on the depth of the root distribution of the crops, and if the crop specie is alfalfa and the depth of the root distribution of alfalfa is 0.80 m, the depth of the bottom boundary may be set to 0.80 m, and as shown in FIG. 2, the distance between AF is set to 0.80 m. The flux of infiltration boundary refers to the amount of water entering the soil domain through the infiltration boundary in unit time. And the soil hydraulic parameters refer to the parameters such as residual soil water content, saturated soil water content, saturated hydraulic conductivity and the parameters in the soil water retention function.

Specifically, the simulation model can be a HYDRUS-2D numerical simulation model, which is a finite element computer model that may be used to simulate two-dimensional soil water movement, and, as will be appreciated, because a complete learning model should include three modules of input, processing and output, none of the three modules is dispensable. Therefore, in the invention, besides the need of determining the simulation model, the input of the simulation model also needs to be determined, and further, in order to improve the irrigation performance, in practical applications, the input of the simulation model is also very important. For example, when it is desired to predict the urban population flow in the next month of city A from the model, if the city population flow of city B or the city population flow of a different month in the last year in city A is selected as the model input for processing, it is obvious that the model prediction results will be far away from the actual city population flow of the next month in city A. In agricultural irrigation, soil water content, deep percolation loss, irrigation uniformity and so on are closely related to the depth of the root distribution of the crops, the working parameters of the irrigation system and soil hydraulic parameters. In order to realize high irrigation performance, the mobile drip irrigation parameters inputted into the simulation model are specifically set according to the depth of the root distribution of the crops, the working parameters of the drip-lines and the soil hydraulic parameters of the planting land. In other words, the depth of the bottom boundary depends on the depth of the root distribution of the crops, the flux of infiltration boundary depends on the working parameters of the drip-lines, and the soil hydraulic parameters depends on the soil texture of the planting land. So that the optimal distance between drip-lines can be obtained more accurately, and the irrigation performance can be further improved.

In addition, it should be noted that the hydraulic design method for mobile drip irrigation on center pivot irrigation system provided by this invention can be applied to center pivot irrigation system and can also be applied to all sprinkler irrigation systems capable of carrying out mobile drip irrigation, such as linear-move irrigation system, a hose reel sprinkler and so on. Due to the advantages of large irrigation area, high degree of automation, strong terrain adaptability and low operation and maintenance costs, center pivot irrigation system is widely used in the agricultural and pastoral areas with open land, few obstacles in the field and relatively high degree of intensive management. Therefore, in this invention, the center pivot irrigation system is taken as the representative for explanation.

Step 200, determining an installation cost function of the irrigation system, obtaining an optimal distance between drip-lines according to the installation cost function of the irrigation system, the soil water content at each observation point and the amount of deep percolation loss, and obtaining a length of each drip-line matched with the optimal distance between drip-lines.

Specifically, the installation cost function of the system is a functional relation between the system installation cost and the distance between drip-lines. The length of each drip-line is calculated by the area principle, and the total length of the drip-lines influenced by the area principle is only related to the irrigation area of the mobile drip irrigation on the center pivot irrigation system. However, the smaller the distance between drip-lines, the larger the labor cost and the fitting cost required for modifying the center pivot irrigation system are, and the larger the damage to the crops possibly caused in the mobile drip irrigation process is, so that the distance between drip-lines needs to be optimized by considering the tradeoff between irrigation performance and the system installation cost.

After the optimal distance between drip-lines is obtained, the optimal length of each drip-line matched with the optimal drip-line distance can be calculated by adopting the area principle, so that the same irrigation depth can be obtained at any position in the irrigation area of the mobile drip irrigation on the center pivot irrigation system. Specifically, the acquisition of the length of each drip-line matched with the optimal distance between drip-lines specifically includes:

Respectively acquiring the emitter discharge of the drip-line, the distance between emitters of the drip-line and the objective discharge of each drip-line;

Acquiring the length of each drip-line matched with the optimal distance between drip-lines according to the emitter discharge of the drip-line and the distance between emitters of the drip-line and the objective discharge of each drip-line.

Specifically, the discharge of each drip-line refers to the sum of the emitter discharge of all the emitters on the drip-line. And it can be understood that in the actual drip irrigation process, under the influence of the damage of the drip-lines, the uneven ground and so on, a certain difference exists between the actual discharge of the drip-lines and the objective discharge of the drip-lines.

In specific application, the length of each drip-line is calculated based on area principle, wherein the area principle assumes that the irrigation area allocated by each drip-line is annular, the width of the irrigation area is equal to the distance between drip-lines, and the irrigation area of the mobile drip irrigation system is the sum of all annular areas with the center pivot as the circle center. Further, the length of any drip-line can be calculated as follows:

$$l_i = d \left\lceil \frac{q_i}{q_d} \right\rceil$$

Where $q_i(m^3/h)$ is the objective discharge of the drip-line, that is, the discharge difference of the main water conveying pipeline between both sides of each drip-line; $q_d(m^3/h)$ is the emitter discharge of the drip-line; d (m) is the distance between emitters of the drip-line.

In the specific application, the distance between emitters and the emitter discharge of the drip-line depend on the type of the drip-line. And the discharge flow fluctuation of the emitters, which may be caused by factors such as hydraulic loss, uneven ground and so on, is not considered in the invention, so that the discharge of the emitters of the drip-line is a fixed value.

Further, in another embodiment of the present disclosure, the objective discharge of each drip-line is obtained by area principle, wherein the derivation formula is as follows:

$$\frac{Q_s - Q_e}{\pi L^2} = \frac{Q_s - Q_i}{\pi r_i^2}$$

Where $Q_s(m^3/h)$ is the inlet flow of the center pivot irrigation system; $Q_e(m^3/h)$ is the tail end flow of the main water conveying pipeline in the mobile drip irrigation area; L(m) is the length of the whole unit for mobile drip irrigation; $r_i(m)$ is the distance from the ith drip-line to the center pivot, and subscript i is the serial number of the drip-lines; $Q_i(m^3/h)$ is the flow of the upstream of the ith drip-line in the main water conveying pipeline.

Further, the calculation formula of the objective discharge of each drip-line is as follows:

$$q_i = (Q_s - Q_e) \frac{a_{i+1}\left(2\sum_{j=1}^{i} a_j + a_{i+1}\right)}{\left(\sum_{j=1}^{N} a_j\right)^2}$$

Where $a_{i+1}(m)$ is the distance between the ith and the i+1th drip-lines; $q_i(m^3/h)$ is the objective discharge of the ith drip-line; N is the total number of drip-lines.

Specifically, the inlet flow and the tail end flow of the main water conveying pipeline in the mobile drip irrigation area are obtained firstly, and then the objective discharge of each drip-line is obtained according to the inlet flow of the center pivot irrigation system, the tail end flow of the main water conveying pipeline and the optimal distance between drip-lines.

Under the ideal condition, the inlet flow of the center pivot irrigation system is usually a fixed value during the operation, and the tail end flow of the main water conveying pipeline is zero without end gun. Specially, the discharge rate distributed by each drip-line in the mobile drip irrigation area in the invention should satisfy the following formula:

$$\frac{Q_s - Q_e}{\pi L^2} = \frac{Q_s - Q_i}{\pi r_i^2}$$

Therefore, besides the inlet flow and the tail end flow of the main water conveying pipeline, the structural parameters of the center pivot irrigation system need to be obtained, for example: the length of the irrigation system, the distance from the mountable first drip-line to the center pivot point and so on. And specifically, the objective discharge of each drip-line in the invention is the discharge difference of the main water conveying pipeline at both sides of each drip-line:

$$q_i = Q_i - Q_{i+1}$$

Therefore, the objective discharge of each drip-line can be obtained as the following formula:

$$q_i = (Q_s - Q_e) \frac{a_{i+1}\left(2\sum_{j=1}^{i} a_j + a_{i+1}\right)}{\left(\sum_{j=1}^{N} a_j\right)^2}$$

Where $a_{i+1}(m)$ is the installation distance between the ith and the (i+1)th drip-line, and the optimal distance between drip-lines can be obtained from step 3; $q_i(m^3/h)$ is the objective discharge of the ith drip-line; N is the total number of drip-lines.

Through respectively acquiring the objective discharge of each drip-line, the distance between emitters and the emitter discharge of the drip-line, determine the length of each drip-line that matched with the optimal distance between drip-lines. Therefore, the invention realizes the difference setting of the length of each drip-line, and then guarantee that the irrigation depth equals in the whole mobile drip irrigation area.

Step 300, acquiring structural parameters of the center pivot irrigation system and a design irrigation depth, and determining working parameters of the center pivot irrigation system according to the structural parameters of the center pivot irrigation system and the design irrigation depth.

Step 400, controlling the center pivot irrigation system to operate according to the working parameters, and performing mobile drip irrigation on crops by employing the optimal distance between drip-lines and the length of each drip-line matched with the optimal distance between drip-lines.

In specific applications, the problems of surface runoff, deep percolation loss, poor irrigation uniformity and so on are related to the distance between drip-lines and the length of each drip-line, and also related to the working parameters of the irrigation system, particularly the travel speed of the pivot, which determines the irrigation depth. In order to ensure a reasonable travel speed of the center pivot, it is needed to further control the working parameters of the irrigation system.

Specifically, the main working parameter of the irrigation system is the value of the percent timer, which controls the travel speed of the pivot, and the irrigation depth is further adjusted. So that the percent timer also players an important role in a mobile drip irrigation on center pivot irrigation system. Wherein, the shortest time the irrigation system required to complete a circle can be calculated according to the following formula:

$$t_{min} = \frac{i_d \cdot L_f}{30D \cdot n \cdot \eta}$$

Wherein the $i_d$ is the total transmission speed ratio of the drive device of the irrigation system; $L_f$(m) is the distance between the center pivot point and the end tower; D(m) is the dynamic effective diameter of the tire; n(r/min) is the rated rotating speed of the driving motor; $\eta$ is the field slip coefficient, and is generally 0.92-0.97.

The minimum irrigation depth $h_{min}$(mm) for one complete circle of the irrigation system can be calculated by the following formula:

$$h_{min} = \frac{500}{\pi} \frac{q_i \cdot t_{min}}{r_i \cdot a_i}$$

Furthermore, the value of the percent timer can be calculated by the following formula:

$$K = \frac{h_{min}}{h}$$

Wherein, h(mm) is the setting value of the irrigation depth, which is usually a flexible value according to the irrigation needs.

For easy understanding, this is illustrated in this embodiment, for example: if the length of the first span of the current center pivot irrigation system is 37 m, the distance between the center pivot point and the end tower is 140 m, the distance between the center pivot and the first mobile drip-line is 2 m. And the dynamic diameter of the tire, the total transmission speed ratio of the drive device, the rated rotating speed of the driving motor and the field slip coefficient are known. Then the minimum irrigation depth for one complete circle of the irrigation system can be obtained to be 6 mm based on the calculation formulas of $t_{min}$ and $h_{min}$. Taking the setting of the irrigation depth of 30 mm as an example, the value of the percent timer at the moment can be finally obtained to be 20%. That is, when the value of the percent timer for controlling the irrigation system is set to be 20%, the mobile drip irrigation on the center pivot irrigation system can be ensured to obtain the irrigation depth of 30 mm at every position in the irrigation area.

Thus, by obtaining the structural parameters of the center pivot irrigation system and the design irrigation depth, the working parameters of the irrigation are determined. And the irrigation system is controlled to operate with the working parameters to meet the irrigation demand of the crops, so as to ensure that the current operating state of the irrigation system is the optimal state. Further, the mobile drip irrigation is carried out with the optimal distance between drip-lines and the length of each drip-line matched with the optimal distance between drip-lines, thus the irrigation performance can be improved.

According to the hydraulic design method for mobile drip irrigation on center pivot irrigation system provided by this invention, the depth of bottom boundary and the flux of infiltration boundary of the soil domain, the soil hydraulic parameters and different distances between drip-lines are inputted into a simulation model. Obtaining the soil water content and the amount of deep percolation loss at the same irrigation depth under different distances between drip-lines outputted by the simulation model. Obtaining the optimal distance between drip-lines according to the installation cost function of the system, soil water content at each observation point and the amount of deep percolation loss. Obtaining the length of each drip-line matched with the optimal distance between drip-lines. Obtaining the structural parameters of the center pivot irrigation system and the design irrigation depth, determining the working parameters of the irrigation system according to the structural parameters of the center pivot irrigation system and the design irrigation depth. Finally controlling the mobile drip irrigation system to irrigate the crops based on the working parameters, wherein the mobile drip irrigation system is installed with the optimal distance between drip-lines and the length of each drip-line matched with the optimal distance between drip-lines. Thus, the hydraulic design method provided by the invention can be carried out considering the soil texture and the crop species, furthermore, by installing the mobile drip irrigation system with the optimal distance between drip-lines and the length of each drip-line matched with the optimal distance between drip-lines, and irrigating the crops based on the working parameter, the mobile drip irrigation system can meet the irrigation needs of crops and achieve high irrigation performance.

Figure 3:
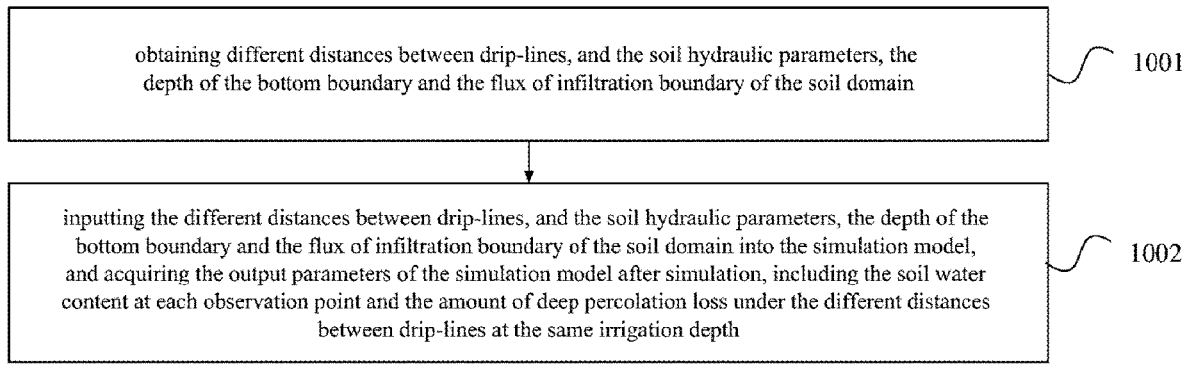
FIG. 3 is a second flowchart of a hydraulic design method for mobile drip irrigation on center pivot irrigation system provided by this invention.

Optionally, in another embodiment disclosed by the present invention, referring to FIG. 3, FIG. 3 is a second flowchart of a hydraulic design method for mobile drip irrigation on center pivot irrigation system provided by this invention. As shown in FIG. 3, before the distances between drip-lines, and the soil hydraulic parameters, the depth of the bottom boundary and the flux of infiltration boundary of the soil domain are inputted into the simulation model, the method further includes the following steps:

Step 1001, obtaining different distances between drip-lines, and the soil hydraulic parameters, the depth of the bottom boundary and the flux of infiltration boundary of the soil domain;

Step 1002, inputting the different distances between drip-lines, and the soil hydraulic parameters, the depth of the bottom boundary and the flux of infiltration boundary of the soil domain into the simulation model, and acquiring the output parameters of the simulation model after simulation, including the soil water content at each observation point and the amount of deep percolation loss under the different distances between drip-lines at the same irrigation depth.

At practical application, after model parameters such as the different distances between drip-lines, the soil hydraulic parameters, the depth of the bottom boundary and the flux of infiltration boundary of the soil domain are input into HYDRUS-2D numerical model, the soil water content at each observation point and the amount of deep percolation loss under different distances between drip-lines at the same irrigation depth can be obtained through the HYDRUS-2D numerical model. Specifically, the relation between soil matrix potential $\psi_m$ and soil water content $\theta$ are obtained through a Van Genuchten model built in the HYDROUS-2D, then the soil water movement simulation is carried out by taking Richards equation as the control equation. After simulation, the output parameters including the soil water content at each observation point and the amount of deep percolation loss under different distances between drip-lines at the same irrigation depth are obtained through linear transformation and other processing.

In the practical application process, the constructed HYDRUS-2D numerical model takes a simplified Richards equation as a control equation:

$$\frac{\partial \theta}{\partial t} = \frac{\partial}{\partial x}\left[K(\theta)\frac{\partial \psi_m}{\partial x}\right] + \frac{\partial}{\partial z}\left[K(\theta)\frac{\partial \psi_m}{\partial z}\right] + \frac{\partial K(\theta)}{\partial z}$$

Wherein x is the abscissa, the vertical upward is defined as the positive direction of the z axis; $\theta(cm^3/cm^3)$ is the soil volume water content; t(h) is time; $K(\theta)$ (cm/h) is the unsaturated hydraulic conductivity; $\psi_m$(CM) is soil matrix potential.

Further, in order to obtain a simulation result through the control equation, the relation between the soil matric potential $\psi_m$ and soil water content $\theta$ in the invention are describe by using Van Genuchten model:

$$S_e = \frac{\theta - \theta_r}{\theta_s - \theta_r} = \frac{1}{(1+|\alpha\psi_m|^n)^m}$$

$$K(S_e) = K_s \cdot S_e^l \left[1-\left(1-S_e^{1/m}\right)^m\right]^2$$

Where $S_e$ is the effective water content; $\theta_r(cm^3/cm^3)$ is the residual water content; $\theta_s$ is the saturated soil moisture content, $K_s$(cm/h) is the saturated hydraulic conductivity; l is the tortuosity parameter in the conductivity function, $\alpha$, m and n are the shape parameters in the van Genuchten model, and m=1−1/n.

Specifically, before inputting the different distances between drip-lines, and the soil hydraulic parameters, the depth of the bottom boundary and the flux of infiltration boundary of the soil domain into the simulation model, the method further includes:

obtaining the depth of the bottom boundary according to a depth of root distribution of the crops;
obtaining the flux of infiltration boundary according to working parameters of the drip-lines; and
obtaining the soil hydraulic parameters according to basic physical parameters of soil.

In practical applications, the amount of deep percolation loss refers to the cumulative flux across the bottom boundary of the soil domain. And the depth of the bottom boundary generally depends on the depth of the root distribution of the crops. If the current crop species is alfalfa, and the depth of the root distribution of alfalfa is 0.80 m, the depth of the bottom boundary of the soil domain can be set to 0.80 m. The flux of infiltration boundary refers to the amount of water entering the soil domain through the infiltration boundary of a unit area in a unit time, and is obtained according to the drip-line working parameters. The drip-line working parameters specifically refer to the emitter discharge and the distance between emitters of the drip-line. The flux of infiltration boundary can be calculated through the following formula:

$$J_w = \frac{q}{d \cdot w}$$

Wherein $J_w$(m/h) is the flux of infiltration boundary; $q(m^3/h)$ is the emitter discharge of the drip-line; d (m) is the distance between emitters of the drip-line; w(m) is the width of the infiltration boundary of the soil domain in the numerical simulation. For example, in practical application, if the crop species is alfalfa and the depth of the root distribution of alfalfa is 0.80 m, the emitter discharge of the drip-line is 0.0076 m³/h, the distance between emitters of the drip-line is 0.15 m, the width of the infiltration boundary of the soil domain in the numerical simulation is set to 0.30 m. Then based on the above calculation formulas, the flux of infiltration boundary can be obtained as 0.169 m/h.

In addition, the soil hydraulic parameters refer to residual water content Or, saturated hydraulic conductivity $K_s$, tortuosity parameter in the conductivity function/and the shape parameters in the van Genuchten model including $\alpha$, m and n. These parameters can be obtained according to a sub-model in HYDRUS-2D: the Rosetta model, which is used for calculating the soil hydraulic parameters according to the basic physical parameters of the soil. And in addition, the soil hydraulic parameters can be obtained by other methods, which are not described again. The basic physical parameters of the soil included dry unit weight, the particle size distribution and so on. For example, the current soil texture is sandy loam, the basic physical parameters of the sandy soil are shown in table 1 below:

TABLE 1 the basic physical parameters of the sandy loam

| dry unit weight | particle size distribution | | |
|---|---|---|---|
| (g/cm³) | 0.01~2.00 μm | 2.00~50.00 μm | 50.00~2000.00 μm |
| 1.5 | 2.521% | 13.524% | 83.955% |

The basic physical parameters of the sandy loam are then inputted into the sub-models of HYDRUS-2D: soil hydraulic parameters of sandy loam can be calculated through Rosetta model, and iterative optimization can be carried out on these parameters through HYDRUS-2D to better describe the physical properties of actual soil. For example, as shown in the following table 2.

TABLE 2 soil hydraulic parameters of the soil in an embodiment

| θr (cm³/cm³) | θs (cm³/cm³) | α (1/cm) | n | Ks (cm/h) | l |
|---|---|---|---|---|---|
| 0.010 | 0.573 | 0.003 | 1.441 | 2.193 | 2.734 |

In the embodiment disclosed by the invention, the mobile drip irrigation parameters are determined according to the depth of the root distribution of the crops, the working parameters of the drip-lines and the basic physical parameters of the soil. And in agricultural irrigation, the soil water content, the amount of deep percolation loss, the irrigation uniformity and so on are closely related to the depth of the root distribution of the crops, the working parameters of the irrigation system and soil hydraulic parameters. Through the hydraulic design method provided by the invention, accurate mobile drip irrigation parameters can be obtained because the simulation model is able to reflect the actual conditions accurately. So that the obtained optimal distance between drip-lines, the length of each drip-line matched with the optimal distance between drip-lines and so on are ensured to better meet the irrigation requirement, and the mobile drip irrigation performance can be improved.

Figure 4:
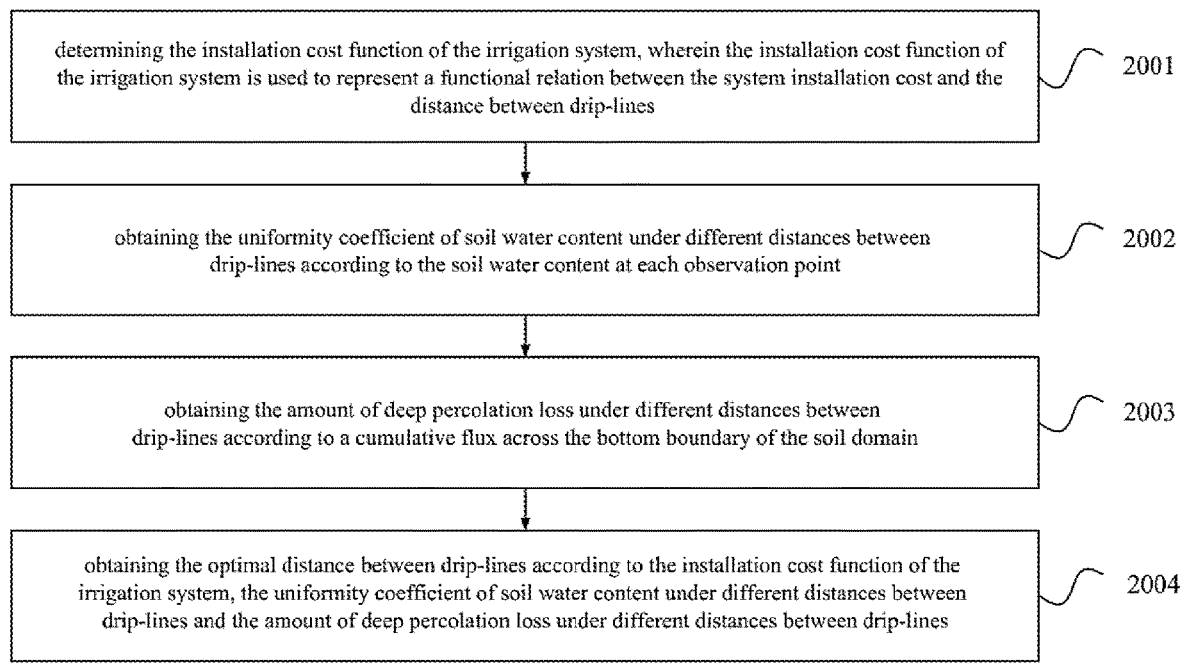
FIG. 4 is a third flowchart of a hydraulic design method for mobile drip irrigation on center pivot irrigation system provided by this invention.

Alternatively, in another embodiment disclosed by the present invention, referring to FIG. 4. FIG. 4 is a third flowchart of a hydraulic design method for mobile drip irrigation on center pivot irrigation system provided by this invention. As shown in FIG. 4, determining the installation cost function of the irrigation system, and then obtaining the optimal distance between drip-lines according to the installation cost function of the irrigation system, the uniformity coefficient of soil water content under different distances between drip-lines, and the amount of deep percolation loss under different distances between drip-lines, specifically includes the following steps 2001~2004.

Step 2001, determining the installation cost function of the irrigation system, wherein the installation cost function of the irrigation system is used to represent a functional relation between the system installation cost and the distance between drip-lines.

Step 2002, obtaining the uniformity coefficient of soil water content under different distances between drip-lines according to the soil water content at each observation point.

Step 2003, obtaining the amount of deep percolation loss under different distances between drip-lines according to a cumulative flux across the bottom boundary of the soil domain.

Step 2004, obtaining the optimal distance between drip-lines according to the installation cost function of the irrigation system, the uniformity coefficient of soil water content under different distances between drip-lines and the amount of deep percolation loss under different distances between drip-lines.

Specifically, the uniformity coefficient of soil water content in the invention refers to Christiansen uniformity coefficient Cu, which is used for evaluating the uniformity of irrigation, wherein the Christiansen uniformity coefficient Cu can be obtained according the following formula:

$$C_u = 1 - \frac{\sum_{i=1}^{n} |\theta_i - \overline{\theta}|}{n \cdot \overline{\theta}} \times 100\%$$

Wherein n is the number of the observation points; $\theta_i(cm^3/cm^3)$ is the soil water content at the ith observation point at the end time of the simulation; $\overline{\theta}(cm^3/cm^3)$ is the average value of the soil water content of the n observation points. As illustrated in FIG. 2, where n is set to be 20, and $\theta_i$ is the soil water content at each observation point at the end time of the simulation, $\overline{\theta}$ is the average value of soil water content of the 20 observation points.

Deep percolation loss occurs when irrigation water exceeds the storage capacity of the soil, and irrigation water seeps downwards into sol layers below the root zone of the crops. Deep percolation is generally regarded as irrigation water loss as the crops cannot utilize this water. Therefore, in this invention, the amount of deep percolation loss Dp is calculated according to cumulative flux across the bottom boundary of the soil domain. The amount of deep percolation loss Dp(mm) is calculated according to the following formula:

$$Dp = 1000 \frac{\int_0^T F_l dt}{w_o}$$

Wherein T(h) is the numerical simulation end time, and is usually not less than 48 h; $F_l(m^2/h)$ is the value of flux across the bottom boundary of the soil domain as a function of time; $w_o(m)$ is the width of the bottom boundary of the soil domain.

Specifically, in an application scenario, the step of obtaining the optimal distance between drip-lines according to the installation cost function of the system, the uniformity coefficient of soil water content under different distances between drip-lines, and the amount of deep percolation loss under different distances between drip-lines, specifically includes steps as follows:

obtaining the uniformity coefficient function through function fitting according to the uniformity coefficient of soil water content under different distances between drip-lines, wherein the uniformity coefficient function is used for expressing a functional relation between the irrigation uniformity and the distances between drip-lines;

obtaining the drainage loss function through function fitting according to the amount of deep percolation loss under different distances between drip-lines, wherein the drainage loss function is used for expressing the functional relation between the amount of deep percolation loss and the distances between drip-lines;

developing a multi-criteria objective function according to the uniformity coefficient function, the drainage loss function and the installation cost function of the irrigation system;

obtaining the optimal distance between drip-lines by solving the multi-criteria objective function.

Figure 5:
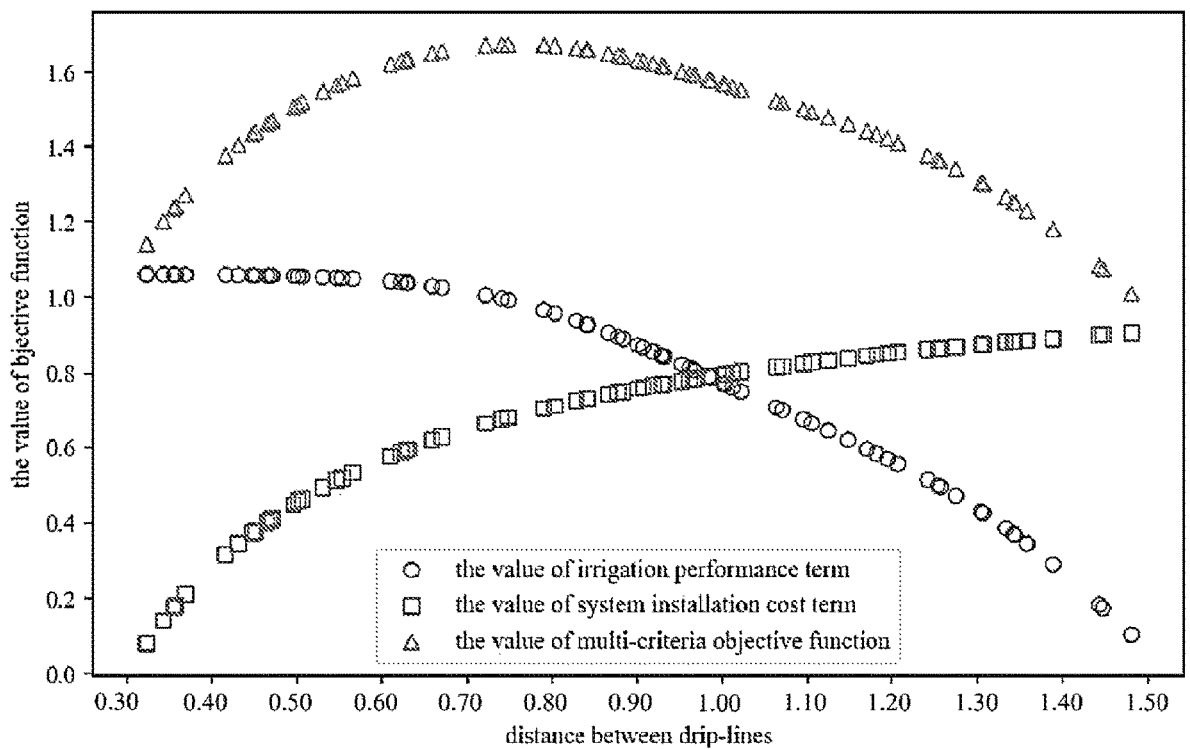
FIG. 5 is a schematic diagram of a function for determining an optimal distance between drip-lines provided by this invention.
Figure 6:
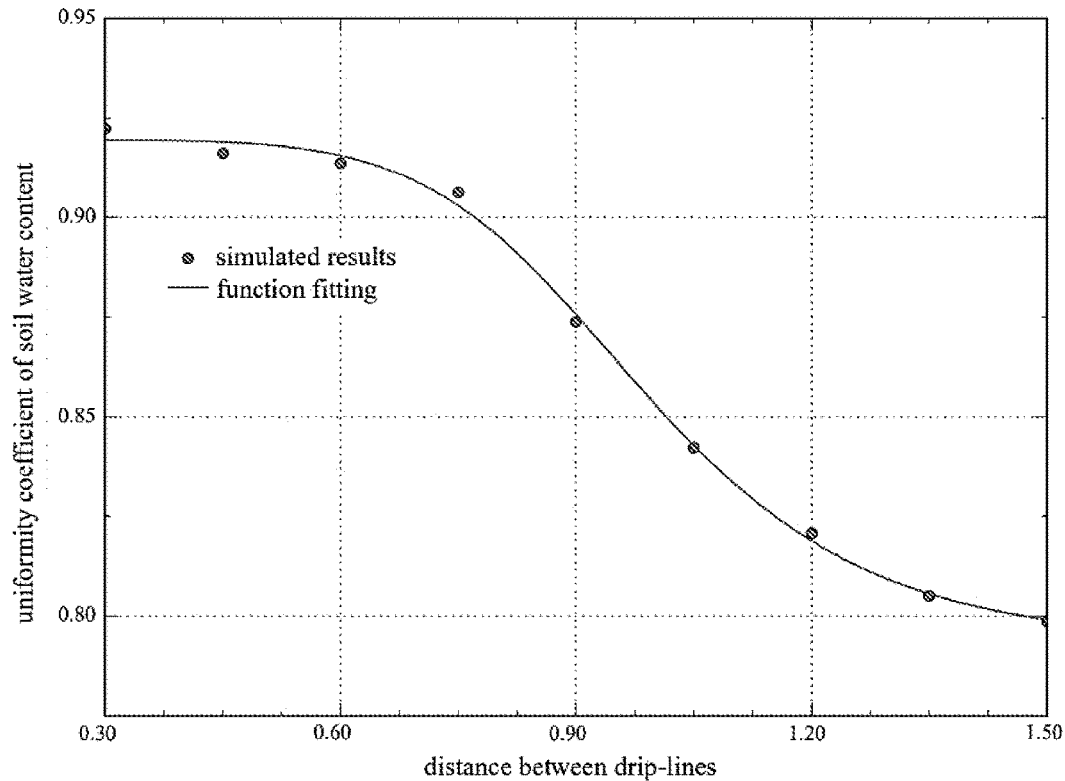
FIG. 6 is a schematic diagram of a functional relation between a uniformity coefficient of soil water content and the distance between drip-lines provided by this invention.
Figure 7:
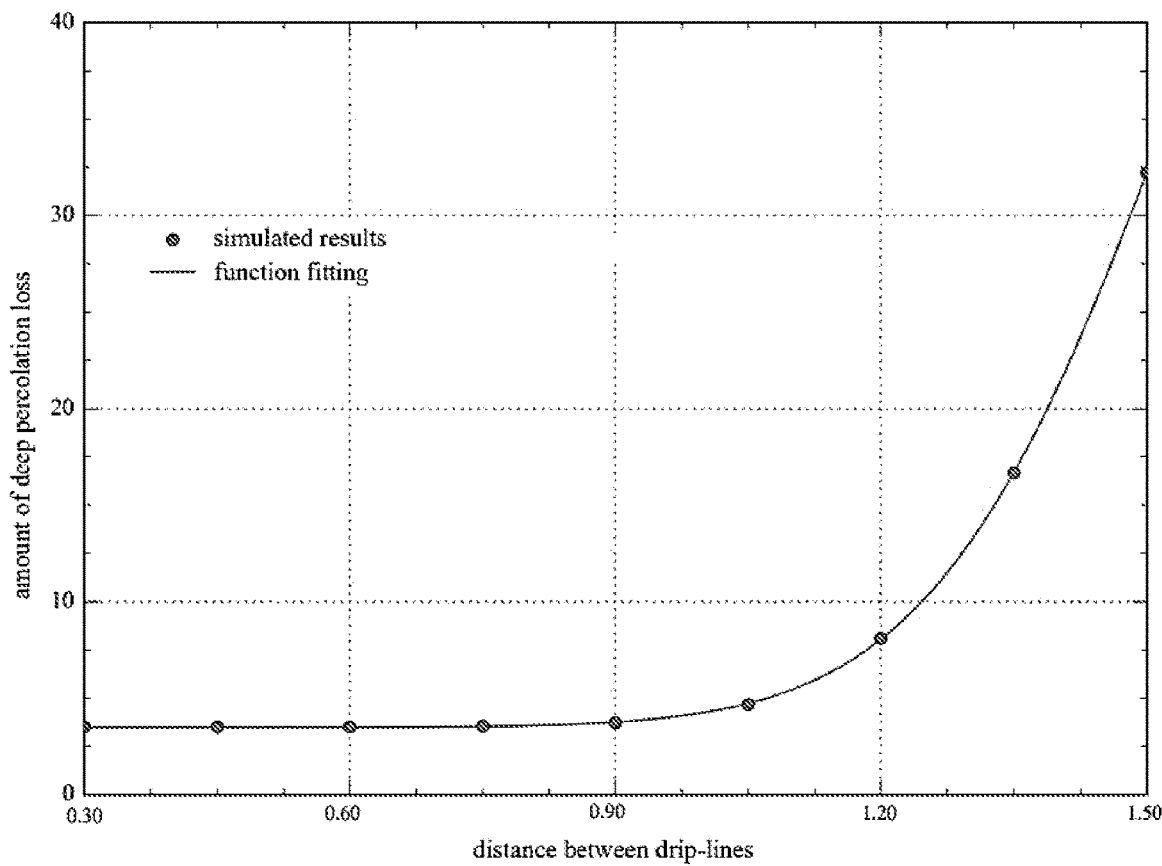
FIG. 7 is a schematic diagram of a functional relation between an amount of deep percolation loss and the distance between drip-lines proved by this invention.

In practical application, the uniformity coefficient of soil water contents under different drip-line installations can be fitted through data processing tools such as MATLAB and Origin, and a functional relation between irrigation uniformity and distance between drip-lines can be obtained. The amount of deep percolation loss under different distances between drip-lines can also be fitted and obtain the functional relation between the amount of deep percolation loss and distances between drip-lines. Further, multi-criteria objective function is obtained and the optimal distance between drip-lines can be obtained based on solving the multi-criteria objective function. For example, FIG. 5 is a schematic diagram of a function for determining the optimal distance between drip-lines according to an embodiment of the invention, which shows the functional relation between the value of the multi-criteria objective function and the distances between drip-lines. The optimal distance between drip-lines can be obtained according to the functional diagram.

According to the invention, the functional relation between the distances between drip-lines and the amount of deep percolation loss as well as that between the distances between drip-lines and the soil water uniformity coefficients are obtained through function fitting. So that the influence of different distances between drip-lines on irrigation uniformity and the amount of deep percolation loss can be better analyzed, the optimal distance between drip-lines can be obtained more accurately. For example: referring to FIG. 6, it can be known from which that the Christiansen uniformity coefficient gradually decreases with the gradual increase of the distance between drip-lines, that is, the irrigation performance is gradually worse. According to FIG. 7, the amount of deep percolation loss is gradually increased along with the gradual increase of the distance between drip-lines, namely the irrigation performance is gradually worse. According to the installation cost function of the system, the mobile drip irrigation system installation investment cost is gradually reduced along with the gradual increase of the distance between drip-lines. Thereby the distance between drip-lines can be reasonably adjusted according to the current situation.

In an embodiment, the developing a multi-criteria objective function according to the uniformity coefficient function, the drainage loss function and the installation cost function of the irrigation system, specifically includes the following steps of:

setting a first weighting factor for the uniformity coefficient function in the multi-criteria objective function according to crop species;

setting a second weighting factor for the drainage loss function in the multi-criteria objective function according to soil conditions;

setting a third weighting factor for the installation cost function of the irrigation system in the multi-criteria objective function according to the cost budget; and developing a multi-criteria objective function according to the first weighting factor, the second weighting factor and the third weighting factor.

Specifically, the multi-criteria objective function is usually constructed as the following form:

$$OF = \omega_1 OF_1 + \omega_2 OF_2 + \omega_3 OF_3$$

Wherein, $OF_1$ is an objective function to improve irrigation uniformity, $OF_2$ is an objective function to reduce the amount of deep percolation loss, $OF_3$ is an objective function to reduce the installation cost of the system; $\omega_1$, $\omega_2$ and $\omega_3$ are respectively the weighting factors of the corresponding objective functions, and are scaled functions with values ranging between zero and one. In order to improve the irrigation performance while control the investment cost, the invention assigning weighting factors respectively to the irrigation uniformity, the amount of deep percolation loss and system installation cost. And further developing a multi-criteria objective function based on the weighting factors and the corresponding objective functions.

It should be further noted that the value of $\omega_1$ can be determined according to the current crop species. For example, if the crops are closely planted like alfalfa, the value of $\omega_1$ can be set close to 1, and if the seeding row distance of the crops are large, the value of $\omega_1$ can be set close to 0. The value of $\omega_2$ can be determined according to the soil texture, and high value of cot should be selected if deep percolation occurs easily. For example, deep percolation occurs easily when the soil is sandy, and the value of $\omega_2$ can be set close to 1 to reduce the loss of irrigation water. The value of $\omega_3$ can be determined according to the system installation cost budget. If the system installation cost budget is low, the value of $\omega_3$ can be set close to 1, and if the system installation cost budget is high, the value can be set close to 0, which is not limited by the present invention. Therefore, by respectively setting weighting factors which can be flexibly regulated for each objective function, the multi-criteria objective function can be more fitted to the current irrigation requirement.

In an embodiment disclosed by the invention, installation cost function of the system is obtained, and uniformity coefficient of soil water content under different distances between drip-lines is calculated according to the soil water content at different observation points, the amount of deep percolation loss under different distances between drip-lines is calculated according to cumulative flux across the bottom boundary of the soil domain. And finally, the optimal distance between drip-lines is calculated according to the installation cost function of the system, uniformity coefficient of soil water content under different distances between drip-lines and the amount of deep percolation loss under different distances between drip-lines. So that the mobile drip irrigation is carried out with the optimal distance between drip-lines and the irrigation performance can be improved.

In addition, for convenience of understanding, this is illustrated in this embodiment, for example: if the crop species is alfalfa, and the depth of the root distribution of alfalfa is 0.80 m, the length of the first span of the center pivot irrigation system is 37 m, the distance between the center pivot point and the end tower is 140 m, the inlet flow of the center pivot irrigation system is 60 m³/h, the interval of the drip-line emitters is 0.15 m, and the emitter discharge of the drip-line is 0.0076 m³/h. The soil texture is sandy loam, and the basic physical parameters of the sandy loam is as follows: the dry unit weight is 1.5 g/cm³, the soil particle proportion of 0.01~2.00 μm is 2.521%, the soil particle proportion of 2.00~50.00 μm is 13.524%, the soil particle proportion of 50.00-2000.00 μm is 83.955%. Furthermore, the depth of the root distribution of alfalfa is considered, the depth of the bottom boundary of the soil domain in HYDRUS-2D numerical model is set to be 0.80 m, the width of the infiltration boundary of the soil domain is set to be 0.30 m, and the flux of infiltration boundary can be calculated to be 0.169 m/h according to the infiltration boundary flux formula. Then, after the basic physical parameters of the sandy loam are inputted into the Rosetta model, soil hydraulic parameters of the sandy loam can be obtained through the Rosetta model, and the detailed results are as follows: θr is 0.010 (cm³/cm³), θs is 0.573 (cm³/cm³), α is 0.003 (1/cm), n is 1.441, Ks is 2.193 (cm/h), and l is 2.734. Then, numerical simulation and function fitting are carried out to obtain the functional relation between the distances between drip-lines and the amount of deep percolation loss as well as that between the distances between drip-lines and soil water uniformity coefficients, and finally, the weighting factors $OF_1$, $OF_2$ and $OF_3$ in the multi-criteria objective function are obtained. Specifically, based on the current simulation result, the objective function to improve irrigation uniformity $OF_1$ is as follows:

$$OF_1 = \frac{\left(0.920 + \frac{-0.127 x^{6.864}}{98.851^{6.864} + x^{6.864}}\right) - Cu(150)}{Cu(30) - Cu(150)}$$

And $OF_2$ is as follows:

$$OF_2 = \frac{Dp(150) - \left(3.519 + \frac{74.921 x^{10.142}}{157.227^{10.142} + x^{10.142}}\right)}{Dp(150) - Dp(30)}$$

Further, since the smaller the distance between drip-lines, the greater the labour cost and the fitting cost required for modifying the center pivot irrigation system are, so that the distance between drip-lines needs to be optimized by considering the tradeoff between irrigation performance and the installation cost. Therefore, the present embodiment introduced an objective function to reduce the installation cost of the system, such as $$OF_3 = \frac{\frac{1}{30} - \frac{1}{x}}{\frac{1}{30} - \frac{1}{150}},$$

where x represents the distance between drip-lines. With the gradual increase of the distance between drip-lines, the system installation cost is continuously reduced, and the value of the objective function is continuously increased. Therefore, in order to ensure the irrigation performance at low cost, $\omega_1=0.5$, $\omega_2=0.5$ and $\omega_3=1.0$ may be selected and substituted into the multi-criteria objective function. The multi-criteria objective function can be inputted into a genetic algorithm as a fitness function to solve the optimal distance between drip-lines, for example, FIG. 5 is a functional diagram for determining the optimal distance between drip-lines provided by this invention. Wherein the value of irrigation performance term is $0.5\ OF_1+0.5\ OF_2$, the value of system installation cost term is $OF_3$. And the value of multi-criteria objective function used to optimize the distance between drip-lines is $0.5\ OF_1+0.5\ OF_2+OF_3$. Thus, the optimal distance between drip-lines is obtained as 0.75 m according to FIG. 5.

After determining the optimal distance between drip-lines to be 0.75 m, the length of each drip-line matched with the optimal distance between drip-lines can be obtained based on the calculation formula of the length of each drip-line. And finally, based on the structural parameters of the center pivot irrigation system, the minimum irrigation depth for one complete circle of the irrigation system can be obtained to be 6 mm by the formula of the shortest time the irrigation system required to complete a circle $t_{min}$ and the minimum irrigation depth for one complete circle of the irrigation $h_{min}$. In the present embodiment, the designed irrigation depth is set to 30 mm, and the value of the percent timer is obtained to be 20% according to the formula of the percent timer $K(\%)$. That is, when the distance between drip-lines is 0.75 m, the percent timer of the irrigation system is 20%, the working parameters of current irrigation system can meet the requirement of irrigation depth.

The hydraulic design device for mobile drip irrigation on center pivot irrigation system provided by this invention is described below, and the hydraulic design device for mobile drip irrigation on center pivot irrigation system described below and the hydraulic design method for mobile drip irrigation on center pivot irrigation system described above can be referred to correspondingly.

Figure 8:
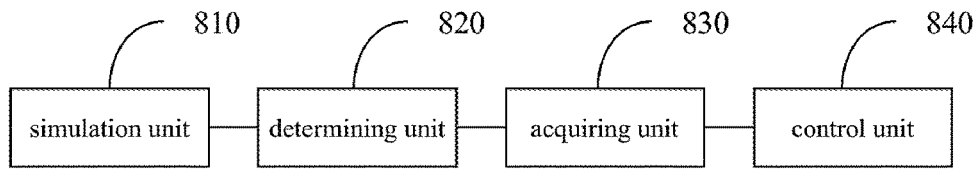
FIG. 8 is a schematic structural diagram of a hydraulic design device for mobile drip irrigation on center pivot irrigation system provided by this invention.

Referring to FIG. 8, which is a structural diagram of a hydraulic design device for mobile drip irrigation on center pivot irrigation system provided by this invention. And as shown in FIG. 8, the hydraulic design device for mobile drip irrigation on center pivot irrigation system includes: a simulation unit 810, a determining unit 820, an acquiring unit 830, and a control unit 840. The simulation unit 810 is used for inputting different distances between drip-lines, and the depth of the bottom boundary, the flux of infiltration boundary and the soil hydraulic parameters of the soil domain into the simulation model, and acquiring the output parameters of the simulation model after simulation, including the soil water content at each observation point and the amount of deep percolation loss under different distances between drip-lines at the same irrigation depth. The determining unit 820 is used for determining an installation cost function of the irrigation system, obtaining an optimal distance between drip-lines according to the installation cost function of the irrigation system, the soil water content at each observation point and the amount of deep percolation loss, and obtaining the length of each drip-line matched with the optimal distance between drip-lines. The acquiring unit 830 is used for acquiring the structural parameters and designed irrigation depth of the irrigation system, and determining the working parameters of the irrigation system according to the structural parameters and the designed irrigation depth of the irrigation system. The control unit 840 is used for controlling the irrigation system to operate according to the working parameters, and employing the optimal distance between drip-lines and the length of each drip-line matched with the optimal distance between drip-lines to carry out mobile drip irrigation on crops. Further, the acquiring unit 830 is further used to obtain the emitter discharge of each drip-line, the distance between emitters of the drip-lines and the objective discharge of each drip-line, and acquire the length of each drip-line matched with the optimal distance between drip-lines according to the emitter discharge of each drip-line, the distance between emitters of the drip-lines and the objective discharge of each drip-line. In an exemplary embodiment, the simulation unit 810, the determining unit 820, the acquiring unit 830 and the control unit 840 are software modules stored in a memory and executable by a processor coupled to the memory.

The hydraulic design device for mobile drip irrigation on center pivot irrigation system provided by this invention, which is characterized in that different distances between drip-lines, the depth of the bottom boundary, the flux of infiltration boundary and the soil hydraulic parameters are inputted into a numerical simulation model, then acquiring the output parameters of the model after simulation, including the soil water content at each observation point and the amount of deep percolation loss under different distances between drip-lines at the same irrigation depth. Then the optimal distance between drip-lines is obtained according to the installation cost function of the system, the soil water content at each observation point and the amount of deep percolation loss. The length of each drip-lines matched with the optimal distance between drip-lines is calculated after the optimal distance between drip-lines is determined. The structural parameters of the center pivot irrigation system and the designed irrigation depth are then obtained, the working parameters of the mobile drip irrigation system are determined according to the structural parameters of the center pivot irrigation system and the designed irrigation depth. Finally, the mobile drip irrigation system is controlled to operate according to the working parameters, and the crops are irrigated by adopting the optimal distance between drip-lines and the length of each drip-line matched the optimal distance between drip-lines. The soil texture and the crop species are considered in this hydraulic design device, and further, the working parameters, the distance between drip-lines under the current condition and the lengths of each drip-line matched with the optimal distance between drip-lines are adopted to irrigation to meet the requirement of crops. With this hydraulic design device, precise irrigation can be achieved, and the irrigation water use coefficient and crop yield can be improved.

According to the hydraulic design device for mobile drip irrigation on center pivot irrigation system provided by this invention, the simulation unit 810 is further used for acquiring different distances between drip-lines, the depth of the bottom boundary, the flux of infiltration boundary and the soil hydraulic parameters. And, inputting the different distances between drip-lines, the depth of the bottom boundary, the flux of infiltration boundary and the soil hydraulic parameters into a numerical simulation model, then acquiring the output parameters of the model after simulation, including the soil water content at each observation point and the amount of deep percolation loss under different distances between drip-lines at the same irrigation depth. Further, the simulation unit 810 is further configured for obtaining the depth of the bottom boundary according to the depth of the root distribution of the crops; obtaining the flux of infiltration boundary according to the working parameters of the drip-lines; obtaining the soil hydraulic parameters according to the basic physical parameters of the soil.

According to the hydraulic design device for mobile drip irrigation on center pivot irrigation system provided by this invention, the mobile drip irrigation parameters are determined according to the depth of the root distribution of the crops, the working parameters of the drip-lines and the basic physical parameters of the soil. And in agricultural irrigation, the soil water content, the amount of the deep percolation loss, the irrigation uniformity and so on are closely related to the depth of the root distribution of the crops, the working parameters of the irrigation system and soil hydraulic parameters. Through the hydraulic design device provided by the invention, accurate mobile drip irrigation parameters can be obtained because the simulation model is able to reflect the actual conditions accurately, and the obtained optimal distance between drip-lines, the length of each drip-line matched with the optimal distance between drip-lines and so on are ensured to better meet the irrigation requirement, and the mobile drip irrigation performance can be improved.

According to the hydraulic design device for mobile drip irrigation on center pivot irrigation system provided by this invention, the determining unit 820 is further used for determining the installation cost function of the irrigation system, which is used to represent the functional relation between the system installation cost and the distance between drip-lines; obtaining the uniformity coefficient of soil water content under different distances between drip-lines according to the soil water content at each observation point; obtaining the amount of deep percolation loss under different distances between drip-lines according to the cumulative flux across the bottom boundary; obtaining an optimal distance between drip-lines according to the installation cost function of the system, the soil water content at each observation point under different distances between drip-lines and the amount of deep percolation loss under different distances between drip-lines. Further, the determining unit 820 is also used for determining the uniformity coefficient function through function fitting according to the uniformity coefficient of soil water content under different distances between drip-lines, wherein the uniformity coefficient function is used for expressing the functional relation between the irrigation uniformity and the distances between drip-lines; obtaining the drainage loss function through function fitting according to the amount of deep percolation loss under different distances between drip-lines, wherein the drainage loss function is used for expressing the functional relation between the amount of deep percolation loss and the distances between drip-lines; developing a multi-criteria objective function according to the uniformity coefficient function, the drainage loss function and the installation cost function of the system; and obtaining the optimal distance between drip-lines by solving the multi-criteria objective function. Further, the determining unit 820 is also used for setting a first weighting factor for the uniformity coefficient function in the multi-criteria objective function according to crop species; setting a second weighting factor for the drainage loss function in the multi-criteria objective function according to soil conditions; setting a third weighting factor for the installation cost function of the system in the multi-criteria objective function according to the cost budget; and developing a multi-criteria objective function according to the first weighting factor, the second weighting factor and the third weighting factor.

According to the hydraulic design device for mobile drip irrigation on center pivot irrigation system provided by this invention, installation cost function of the system is obtained, and uniformity coefficient of soil water content under different distances between drip-lines is calculated according to the soil water content at different observation points, the amount of deep percolation loss under different distances between drip-lines is calculated according to cumulative flux across the bottom boundary of the soil domain. And finally, the optimal distance between drip-lines is calculated according to the installation cost function of the system, uniformity coefficient of soil water content under different distances between drip-lines and the amount of deep percolation loss under different distances between drip-lines. So that the mobile drip irrigation is carried out through the optimal distance between drip-lines and the irrigation performance can be improved.

Figure 9:
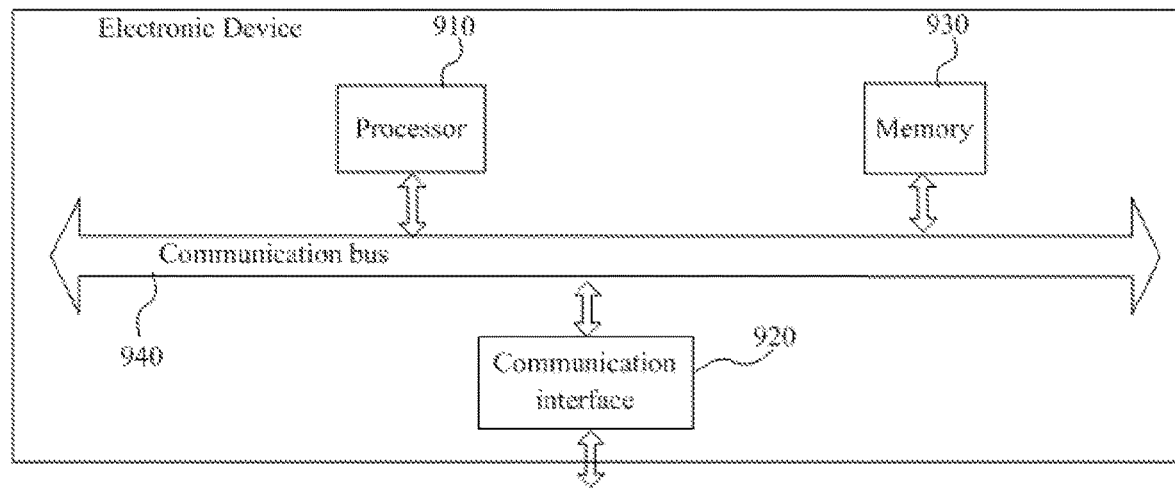
FIG. 9 is a schematic structural diagram of an electronic device provided by this invention.

FIG. 9 illustrates a schematic structural diagram of an electronic device/equipment provided by this invention. As shown in FIG. 9, the electronic device may include: a processor 910, a communications interface 920, a memory 930 and a communication bus 940. The processor 910, the communications interface 920 and the memory 930 are coupled for communication via the communication bus 940. The processor 910 may invoke logic instructions in memory 930 to perform hydraulic design method for mobile drip irrigation on center pivot irrigation system, the method including: inputting different distances between drip-lines, and the depth of the bottom boundary, the flux of infiltration boundary and the soil hydraulic parameters of a soil domain into the simulation model, and acquiring the output parameters of the simulation model after simulation, including the soil water content at each observation point and the amount of deep percolation loss under different distances between drip-lines at the same irrigation depth; determining the installation cost function of the system, obtaining an optimal distance between drip-lines according to the installation cost function of the irrigation system, the soil water content at each observation point and the amount of deep percolation loss, and obtaining the length of each drip-line matched with the optimal distance between drip-lines; obtaining the structural parameters of the center pivot irrigation system and the designed irrigation depth, and determining the working parameters of the irrigation system; and controlling the irrigation system to irrigate crops based on the working parameters, wherein the irrigation system is installed with the optimal distance between drip-lines and the length of each drip-line matched with the optimal distance between drip-lines.

Furthermore, the logic instructions in the memory 930 may be implemented in the form of software functional units and stored in a computer readable storage medium when the software functional units are sold or used as independent products. Thus, the technical solution of the present invention or a part thereof which substantially contributes to the current technology may be embodied in the form of a software product, which is stored in a storage medium and includes several instructions for causing a computer device (which may be a personal computer, a server, or a network device) to execute all or part of the steps of the method according to the embodiments of the present invention. And the aforementioned storage medium includes; a U-disk, a removable hard disk, a Read-Only Memory (ROM), a Random Access Memory (RAM), a magnetic disk, or an optical disk, and various media capable of storing program codes.

In another aspect, the present invention also provides a computer program product including a computer program, the computer program being storable on a non-transitory computer readable storage medium, the computer program, when executed by a processor, being capable of executing the hydraulic design method for mobile drip irrigation on center pivot irrigation system provided by the above methods, the method including: inputting different distances between drip-lines, the depth of the bottom boundary, the flux of infiltration boundary and the soil hydraulic parameters into the simulation model, and acquiring the output parameters of the model after simulation, including the soil water content at each observation point and the amount of deep percolation loss under different distances between drip-lines at the same irrigation depth; determining the installation cost function of the system, obtaining an optimal distance between drip-lines according to the installation cost function of the system, the soil water content at each observation point and the amount of deep percolation loss, and obtaining the length of each drip-line matched with the optimal distance between drip-lines; obtaining the structural parameters of the center pivot irrigation system and the designed irrigation depth, and determining the working parameters of the irrigation system; and controlling the irrigation system to irrigate crops according to the working parameters, wherein the irrigation system is installed in the optimal distance between drip-lines and the length of each drip-line matched with the optimal distance between drip-lines.

The above-described embodiments of the apparatus are merely illustrative, and the units described as separate parts may or may not be physically separated, and parts displayed as units may or may not be physical units, may be located in one position, or may be distributed on multiple network units. Some or all of the modules may be selected according to actual needs to achieve the purpose of this embodiment. Based on the described embodiments of the invention, all other embodiments obtained by ordinary skill in the art without creative effort belong to the scope of protection of the invention.

Through the above description of the embodiments, those skilled in the art will clearly understand that each embodiment may be implemented by software plus a necessary general hardware platform, and may also be implemented by hardware. Based on the understanding, the above technical solutions substantially or otherwise contributing to the current technology may be embodied in the form of a software product, which may be stored in a computer-readable storage medium, such as ROM/RAM, magnetic disk, optical disk, etc., and includes several instructions for causing a computer device (which may be a personal computer, a server, or a network device, etc.) to execute the method according to the various embodiments or some parts of the embodiments.

Finally, it should be noted that: the above examples are only intended to illustrate the technical solution of the present invention, and not to limit it; although the present invention has been described in detail with reference to the foregoing embodiments, it should be understood by those of ordinary skill in the art that: the technical solutions described in the foregoing embodiments may still be modified, or some technical features may be equivalently replaced; and such modifications or substitutions do not depart from the spirit and scope of the corresponding technical solutions of the embodiments of the present invention.

What is claimed is:

1. A hydraulic design method for mobile drip irrigation on center pivot irrigation system, comprising:
   inputting a depth of a bottom boundary, a flux of infiltration boundary and soil hydraulic parameters of a soil domain, and different distances between drip-lines into a simulation model; and acquiring output parameters of the simulation model after simulation, including a soil water content at each observation point and an amount of deep percolation loss under the different distances between drip-lines at the same irrigation depth;
   determining an installation cost function of the center pivot irrigation system; obtaining an optimal distance between drip-lines according to the installation cost function, the soil water content at each observation point and the amount of deep percolation loss; and obtaining a length of each drip-line matched with the optimal distance between drip-lines;
   obtaining structural parameters of the center pivot irrigation system and a designed irrigation depth, and determining working parameters of the center pivot irrigation system according to the structural parameters of the center pivot irrigation system and the designed irrigation depth; and
   controlling the center pivot irrigation system to operate based on the working parameters and employing the optimal distance between drip-lines and the length of each drip-line matched with the optimal distance between drip-lines to perform mobile drip irrigation;
   wherein determining an installation cost function of the center pivot irrigation system, and obtaining an optimal distance between drip-lines according to the installation cost function, the soil water content at each observation point and the amount of deep percolation loss, specifically comprises:
      determining the installation cost function of the center pivot irrigation system, wherein the installation cost function is configured to represent a functional relation between a system installation cost and the distance between drip-lines;
      obtaining a uniformity coefficient of soil water content under the different distances between drip-lines according to the soil water content at each observation point;
      obtaining the amount of deep percolation loss under the different distances between drip-lines according to a cumulative flux across the bottom boundary of the soil domain; and
      obtaining the optimal distance between drip-lines according to the installation cost function, the uniformity coefficient of soil water content under the different distances between drip-lines and the amount of deep percolation loss under the different distances between drip-lines;
   wherein obtaining a length of each drip-line matched with the optimal distance between drip-lines, specifically comprises:
      acquiring an emitter discharge of each drip-line, a distance between emitters of the drip-lines and an objective discharge of each drip-line; and
      acquiring the length of each drip-line matched with the optimal distance between drip-lines according to the emitter discharge of each drip-line, the distance between emitters of the drip-lines and the objective discharge of each drip-line;
      wherein, the objective discharge of each drip-line is obtained based on an area principle, and an area principle calculation formula is as follows:

$$\frac{Q_s - Q_e}{\pi L^2} = \frac{Q_s - Q_i}{\pi r_i^2}$$

where $Q_s$ is an inlet flow of the center pivot irrigation system; $Q_e$ is a tail end flow of a main water conveying pipeline in a mobile drip irrigation area; L is a length of a whole unit for mobile drip irrigation; $r_i$ is a distance from an ith drip-line to a center pivot, and subscript i is a serial number of the drip-lines; $Q_i$ is a flow of an upstream of the ith drip-line in the main water conveying pipeline;

further, a calculation formula of the objective discharge of each drip-line is as follows:

$$q_i = (Q_s - Q_e) \frac{a_{i+1}\left(2\sum_{j=1}^{i} a_j + a_{i+1}\right)}{\left(\sum_{j=1}^{N} a_j\right)^2}$$

where $a_{i+1}$ is a distance between the ith and the (i+1)th drip-lines; $q_i$ is the objective discharge of the ith drip-line; N is a total number of the drip-lines;

further, a calculation formula of the length of each drip-line is as follows:

$$l_i = d\left\lceil \frac{q_i}{q_d} \right\rceil$$

where $q_d$ is the emitter discharge of the drip-line; d is the distance between emitters.

2. The hydraulic design method for mobile drip irrigation on center pivot irrigation system as claimed in claim 1, wherein before inputting a depth of a bottom boundary, a flux of infiltration boundary and soil hydraulic parameters of a soil domain, and different distances between drip-lines into a simulation model, the method further comprises:
obtaining the depth of the bottom boundary according to a depth of root distribution of the crops;
obtaining the flux of infiltration boundary according to working parameters of the drip-lines; and
obtaining the soil hydraulic parameters according to soil basic physical parameters.

3. The hydraulic design method for mobile drip irrigation on center pivot irrigation system as claimed in claim 1, wherein obtaining the optimal distance between drip-lines according to the installation cost function, the uniformity coefficient of soil water content under the different distances between drip-lines and the amount of deep percolation loss under the different distances between drip-lines, specifically comprises:
obtaining a uniformity coefficient function through function fitting according to the uniformity coefficient of soil water content under the different distances between drip-lines, wherein the uniformity coefficient function is configured to express a functional relation between irrigation uniformity and the distances between drip-lines;
obtaining a drainage loss function through function fitting according to the amount of deep percolation loss under the different distances between drip-lines, wherein the drainage loss function is configured to express a functional relation between the amount of deep percolation loss and the distances between drip-lines;

developing a multi-criteria objective function according to the uniformity coefficient function, the drainage loss function and the installation cost function; and
obtaining the optimal distance between drip-lines by solving the multi-criteria objective function.

4. The hydraulic design method for mobile drip irrigation on center pivot irrigation system as claimed in claim 3, wherein developing a multi-criteria objective function according to the uniformity coefficient function, the drainage loss function and the installation cost function, specifically comprises:
setting a first weighting factor for the uniformity coefficient function according to crop species of the crops;
setting a second weighting factor for the drainage loss function according to soil conditions;
setting a third weighting factor for the installation cost function according to a cost budget; and
developing the multi-criteria objective function according to the first weighting factor, the second weighting factor and the third weighting factor.

5. A hydraulic design device for mobile drip irrigation on center pivot irrigation system, comprising:
a simulation unit, configured to input a depth of a bottom boundary, a flux of infiltration boundary, soil hydraulic parameters of a soil domain, and different distances between drip-lines into a simulation model, and acquire output parameters of the simulation model after simulation, including a soil water content at each observation point and an amount of deep percolation loss under the different distances between drip-lines at the same irrigation depth;
a determining unit, configured to determine an installation cost function of the center pivot irrigation system, obtain an optimal distance between drip-lines according to the installation cost function, the soil water content at each observation point and the amount of deep percolation loss, and obtain a length of each drip-line matched with the optimal distance between drip-lines;
an acquiring unit, configured to acquire structural parameters of the center pivot irrigation system and a designed irrigation depth of mobile drip irrigation, and determine working parameters of the center pivot irrigation system according to the structural parameters of the center pivot irrigation system and the designed irrigation depth; and
a control unit, configured to control the center pivot irrigation system to operate according to the working parameters and employ the optimal distance between drip-lines and the length of each drip-line matched with the optimal distance between drip-lines to perform mobile drip irrigation;
wherein determining the installation cost function of the center pivot irrigation system, and obtaining the optimal distance between drip-lines according to the installation cost function, the soil water content at each observation point and the amount of deep percolation loss, specifically comprises:
determining the installation cost function of the center pivot irrigation system, wherein the installation cost function is configured to represent a functional relation between a system installation cost and the distance between drip-lines;
obtaining a uniformity coefficient of soil water content under the different distances between drip-lines according to the soil water content at each observation point;

obtaining the amount of deep percolation loss under the different distances between drip-lines according to a cumulative flux across the bottom boundary of the soil domain; and obtaining the optimal distance between drip-lines according to the installation cost function, the uniformity coefficient of soil water content under the different distances between drip-lines and the amount of deep percolation loss under the different distances between drip-lines;

wherein obtaining the length of each drip-line matched with the optimal distance between drip-lines, specifically comprises:

acquiring an emitter discharge of each drip-line, a distance between emitters of the drip-lines and an objective discharge of each drip-line; and acquiring the length of each drip-line matched with the optimal distance between drip-lines according to the emitter discharge of each drip-line, the distance between emitters of the drip-lines and the objective discharge of each drip-line;

wherein, the objective discharge of each drip-line is obtained based on an area principle, and an area principle calculation formula is as follows:

$$\frac{Q_s - Q_e}{\pi L^2} = \frac{Q_s - Q_i}{\pi r_i^2}$$

where $Q_s$ is an inlet flow of the center pivot irrigation system; $Q_e$ is a tail end flow of a main water conveying pipeline in a mobile drip irrigation area; L is a length of a whole unit for mobile drip irrigation; $r_i$ is a distance from an ith drip-line to a center pivot, and subscript i is a serial number of the drip-lines; $Q_i$ is a flow of an upstream of the ith drip-line in the main water conveying pipeline;

further, a calculation formula of the objective discharge of each drip-line is as follows:

$$q_i = (Q_s - Q_e)\frac{a_{i+1}\left(2\sum_{j=1}^{i} a_j + a_{i+1}\right)}{\left(\sum_{j=1}^{N} a_j\right)^2}$$

where $a_{i+1}$ is a distance between the ith and the (i+1)th drip-lines; $q_i$ is the objective discharge of the ith drip-line; N is a total number of the drip-lines;

further, a calculation formula of the length of each drip-line is as follows:

$$l_i = d\left\lceil \frac{q_i}{q_d} \right\rceil$$

where $q_d$ is the emitter discharge of the drip-line; d is the distance between emitters.

6. An electronic device comprising: a memory, a processor and a computer program stored on the memory and executable on the processor; wherein the processor, when executes the program, implements the hydraulic design method for mobile drip irrigation on center pivot irrigation system according to claim 1.

* * * * *